United States Patent [19]

Baillely et al.

[11] Patent Number: 5,792,738
[45] Date of Patent: Aug. 11, 1998

[54] GRANULAR LAUNDRY DETERGENT COMPOSITIONS CONTAINING STABILISED PERCARBONATE BLEACH PARTICLES

[75] Inventors: Gerard Marcel Baillely, Gosforth; Anthony Dovey; Graham Alexander Sorrie, both of Morpeth; David William York, Ponteland, all of United Kingdom

[73] Assignee: The Procter & Gamble Company, Cincinnati, Ohio

[21] Appl. No.: 581,576

[22] PCT Filed: Jul. 13, 1994

[86] PCT No.: PCT/US94/07825

§ 371 Date: Jan. 16, 1996

§ 102(e) Date: Jan. 16, 1996

[87] PCT Pub. No.: WO95/02670

PCT Pub. Date: Jan. 26, 1995

[30] Foreign Application Priority Data

Jul. 14, 1993 [EP] European Pat. Off. ............. 93870146

[51] Int. Cl.$^6$ ................................ C11D 3/04; C11D 17/06
[52] U.S. Cl. .................... 510/375; 510/302; 510/315; 510/442; 510/444; 510/318; 252/186.27; 252/186.32; 423/415.2
[58] Field of Search .................... 252/186.27, 186.31, 252/186.32; 510/375, 442, 477, 318, 302, 315; 423/415.2

[56] References Cited

U.S. PATENT DOCUMENTS

| 4,526,698 | 7/1985 | Kuroda et al. | 252/99 |
| 5,078,895 | 1/1992 | Dany et al. | 252/94 |
| 5,258,133 | 11/1993 | Chapple | 252/95 |
| 5,291,549 | 3/1994 | Izumi | 379/233 |
| 5,332,518 | 7/1994 | Kuroda et al. | 252/99 |
| 5,340,496 | 8/1994 | Sato et al. | 252/186.27 |
| 5,366,655 | 11/1994 | Yamashita et al. | 252/186.27 |
| 5,462,804 | 10/1995 | Kokubu et al. | 428/402.24 |
| 5,478,488 | 12/1995 | Doetsch et al. | 252/95 |

*Primary Examiner*—Margaret Einsmann
*Attorney, Agent, or Firm*—Brian M. Bolam; Ian S. Robinson; Kim William Zerby

[57] ABSTRACT

There is provided a granular, silicate-built, phosphate free laundry detergent composition comprising fine alkali metal percarbonate particles having mean particle diameter below 450 µm, preferably below 400 µm, wherein no more than 20%, preferably no more than 10%, of the particles have a diameter above 710 µm, said particles having a coating comprising one or more soluble inorganic salts. The salts may be selected from alkali or alkaline earth metal carbonates, sulphates, chlorides and nitrates. The coated percarbonate particles have improved stability to storage and are capable of dissolving quickly in wash liquor.

13 Claims, No Drawings

GRANULAR LAUNDRY DETERGENT COMPOSITIONS CONTAINING STABILISED PERCARBONATE BLEACH PARTICLES

This invention relates to granular laundry detergent compositions having a content of silicate-based builder and alkali metal percarbonate as an oxygen-releasing compound.

Detergent compositions containing alkali metal percarbonate are known in the art. Percarbonate is an attractive perhydrate bleaching agent for use in detergent compositions because it dissolves readily in water, is weight efficient and, after giving up its available oxygen, provides a useful source of carbonate ions for detergency purposes and does not provide undesirable by-products.

The inclusion of percarbonate salts in laundry detergent compositions has been restricted hitherto by their relative instability in storage. In particular, percarbonate salts decompose rapidly when stored in a moist and/or warm atmosphere.

It has been attempted to obtain acceptable storage characteristics by coating crystalline percarbonate. A variety of coating agents have been proposed including silicate and mixtures of inorganic sulphate and carbonate salts. An example of such a coating is disclosed in GB-A-1,466,799, which discloses percarbonate particles coated with a mixed salt comprising sodium carbonate and one or more other sodium salts. The storage stability was tested of these percarbonate particles in a detergent composition comprising phosphate builders.

Considerable interest exists in the development of more "environmentally friendly" detergent compositions and processes, for instance for washing laundry in the home. "Environmentally friendly" detergent compositions are often characterised in that they minimise the levels of components which may cause environmentally undesirable effects. Thus phosphate builders are considered undesirable.

Preferred builders are based on silicate, including aluminosilicate ion exchange materials known as zeolites, and contain no phosphate. However the storage stability of percarbonate is a greater problem in silicate-built (especially zeolite-built) detergent powders than in phosphate-built detergent powders, possibly due to the fact that such compositions tend to have a large mobile water content.

It has been attempted to solve this problem in EP-A-0451,893. This discloses zeolite-built detergent powders containing sodium percarbonate with a controlled particle size distribution; fine percarbonate particles are excluded and coarser particles having high mean particle diameter are used. Reactivity is inversely proportional to size and so the coarser particles are of lower reactivity than finer particles. Hence the percarbonate particles are more storage stable in the presence of moisture.

However coarser particles used have lower solubility and/or are slower to dissolve in wash liquor and hence give a lower performance than finer particles, which dissolve quickly but have a lower storage stability.

Solubility problems have been encountered with coatings for percarbonate particles other than coatings such as those described in GB 1,466,799. Coatings based on silicates and organic materials can render the coated particles insufficiently soluble. Silicates in particular leads to, further problems in hard water, where they can form salts of low solubility.

Thus the prior art presents a problem of obtaining detergent compositions containing silicate as builder and storage stable yet fast dissolving percarbonate.

According to the invention there is provided a granular, silicate-built, phosphate-free laundry detergent composition comprising alkali metal percarbonate in the form of particles of mean particle diameter below 450 µm wherein no more than 20% of the particles have a diameter above 710 µm, said particles having a coating comprising water soluble material selected from water soluble inorganic salts, which can adopt a higher hydrated state, water soluble salts of carboxylic acids and mixtures thereof.

The invention is based in part on the discovery that it is possible to produce a granular laundry detergent composition containing fine percarbonate particles having a coating of water soluble organic or inorganic salts so that the particles of percarbonate dissolve sufficiently quickly but have improved storage stability. The coating is itself soluble and therefore does not inhibit the solubility of the percarbonate particles or their bleaching performance.

One or more water soluble inorganic salts may be used as coating materials. If this is done, at least one of the soluble inorganic salts used to coat the percarbonate particles is in a state such that it is capable of absorbing moisture by increasing its level of hydration. Therefore such a salt will possess one or more hydrated states and will be in either the anhydrous state or in one of the lower hydrated states.

Alternatively water soluble salts of carboxylic acids may be used as coating materials according to the invention and are effective to increase to storage stability of the percarbonate particles.

Mixtures of the inorganic salts and carboxylic acid salts of the invention may be used.

Both types of coating material are believed to act as a physical barrier to moisture, thus aiding the increase of storage stability of the percarbonate particles.

The water soluble inorganic salts are preferably salts of alkali or alkaline earth metals, for instance alkali or alkaline earth metal carbonates; alkali or alkaline earth metal sulphates; mixed salts of alkali or alkaline earth metal sulphates and carbonates; mixed salts of alkali or alkaline earth metal chlorides and carbonates; mixed salts of alkali or alkaline earth metal nitrates and carbonates. The salt or salts which have one or more hydrated states are preferably in the anhydrous or lowest hydrated state, more preferably in the anhydrous state.

Preferred water soluble salts of carboxylic acids are citrate and succinate. Mixtures of carboxylic acid salts may be used.

The amount of coating material incorporated is preferably at least 1% by weight of percarbonate particles, more preferably at least 2% by weight, and may be up to 5% or 10% by weight or more. Most preferably the coating material is incorporated in an amount of about 2.5% by weight of percarbonate particles.

The coating material may further comprise one or more water soluble surfactants in addition to the water soluble inorganic salt or salts and/or carboxylic acid salts. Suitable surfactants may be selected from for instance, from, linear alkyl benzene sulphonates (LAS), short chain ($C_{12}$–$C_{14}$) alkyl sulphates, short chain ($C_{12}$–$C_{14}$) alkyl ethoxy sulphates, paraffin sulphonates (carbon chain of 12 to 16 carbon atoms) and mixtures thereof.

When coated, the percarbonate particles may optionally be further coated with hydrophobic silica, in the process known as "dusting".

The percarbonate particles have a mean diameter below 450 µm with no more than 20% of the particles having a diameter above 710 µm. There is no lower limit on the mean particle diameter, but it is generally above 200 µm, preferably between 300 µm and 420 µm, more preferably between 300 µm and 400 µm, most preferably below 350 µm, with no more than 10% of the particles having a diameter above 710 μm and no more than 5% of the particles having a diameter below 150 μm.

In particularly preferred embodiments the coated percarbonate particles are introduced into the detergent composition by dry mixing.

The granular detergent compositions in accord with the invention may comprise from 1% to 40% by weight of the composition, preferably from 2% to 15% by weight, most preferably from 3% to 10% by weight of a peroxyacid bleach activator.

Peroxyacid bleach activators (bleach precursors) as additional bleaching components in accord with the invention can be selected from a wide range of classes and are preferably those containing one or more N- or O-acyl groups.

Suitable classes include anhydrides, esters, amides and acylated derivatives of imidazoles and oximes, and examples of useful materials within these classes are disclosed in GB-A-1586789. The most preferred classes are esters such as are disclosed in GB-A-836 988, 864 798, 1 147 871 and 2 143 231 and amides such as are disclosed in GB-A-855 735 and 1 246 338.

Particularly preferred bleach activator compounds as additional bleaching components in accord with the invention are the N-,N,N'N' tetra acetylated compounds of formula

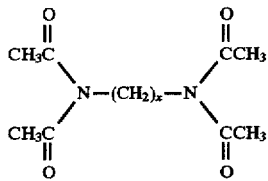

where x can be 0 or an integer between 1 and 6.

Examples include tetra acetyl methylene diamine (TAMD) in which x=1, tetra acetyl ethylene diamine (TAED) in which x=2 and Tetraacetyl hexylene diamine (TAHD) in which x=6. These and analogous compounds are described in GB-A-907 356. The most preferred peroxyacid bleach activator as an additional bleaching component is TAED.

Another preferred class of peroxyacid bleach activator compounds are the amide substituted compounds of the following general formulae:

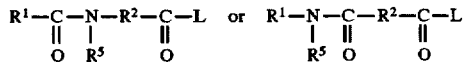

wherein $R^1$ is an aryl or alkaryl group with from about 1 to about 14 carbon atoms, $R^2$ is an alkylene, arylene, and alkarylene group containing from about 1 to 14 carbon atoms, and $R^5$ is H or an alkyl, aryl, or alkaryl group containing 1 to 10 carbon atoms and L can be essentially any leaving group. $R^1$ preferably contains from about 6 to 12 carbon atoms. $R^2$ preferably contains from about 4 to 8 carbon atoms. $R^1$ may be straight chain or branched alkyl, substituted aryl or alkylaryl containing branching, substitution, or both and may be sourced from either synthetic sources or natural sources including for example, tallow fat. Analogous structural variations are permissible for $R^2$. The substitution can include alkyl, aryl, halogen, nitrogen, sulphur and other typical substituent groups or organic compounds. $R^5$ is preferably H or methyl. $R^1$ and $R^5$ should not contain more than 18 carbon atoms total. Amide substituted bleach activator compounds of this type are described in EP-A-0170386.

The compositions of the invention in addition comprise, in general terms, those ingredients conventionally found in laundry detergent products.

A wide range of surfactants can be used in the detergent compositions. A typical listing of anionic, nonionic, amphyolytic and zwitterionic classes, and species of these surfactants, is given in U.S. Pat. No. 3,929,678 issued to Laughlin and Heuring on Dec. 30, 1975. A list of suitable cationic surfactants is given in U.S. Pat. No. 4,259,217 issued to Murphy on Mar. 31, 1981.

Mixtures of anionic surfactants are suitable herein, particularly blends of sulphate, sulphonate and/or carboxylate surfactants. Mixtures of sulphonate and sulphate surfactants are normally employed in a sulphonate to sulphate weight ratio of from 5:1 to 1:2, preferably from 3:1 to 2:3, more preferably from 3:1 to 1:1.

Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$, fatty source, preferably from a $C_{16}$–$C_{18}$ fatty source. In each instance the cation is an alkali metal, preferably sodium. Preferred sulphate surfactants in such sulphonate sulphate mixtures are alkyl sulphates having from 12 to 22, preferably 16 to 18 carbon atoms in the alkyl radical. Another useful surfactant system comprises a mixture of two alkyl sulphate materials whose respective mean chain lengths differ from each other. One such system comprises a mixture of $C_{14}$–$C_{15}$ alkyl sulphate and $C_{16}$–$C_{18}$ alkyl sulphate in a weight ratio of $C_{14}$–$C_{15}$:$C_{16}$–$C_{18}$ of from 3:1 to 1:1. The alkyl sulphates may also be combined with alkyl ethoxy sulphates having from 10 to 20, preferably 10 to 16 carbon atoms in the alkyl radical and an average degree of ethoxylation of 1 to 6. The cation in each instance is again an alkali metal, preferably sodium.

Other anionic surfactants suitable for the purposes of the invention are the alkali metal sarcosinates of formula

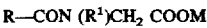

wherein R is a $C_9$–$C_{17}$ linear or branches alkyl or alkenyl C group. $R^1$ is a $C_1$–$C_4$ alkyl group and M is an alkali metal ion. Preferred examples are the lauroyl, Cocoyl ($C_{12}$–$C_{14}$), myristyl and oleyl methyl sarcosinates in the form of their sodium salts.

One class of nonionic surfactants useful in the present invention comprises condensates of ethylene oxide with a hydrophobic moiety, providing surfactants having an average hydrophilic-lipophilic balance (HLB) in the range from 8 to 17, preferably from 9.5 to 13.5, more preferably from 10 to 12.5 in which the hydrophobic (lipophilic) moiety may be aliphatic or aromatic in nature. Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol and the $C_{12}$–$C_{14}$ primary alcohols containing 3–5 moles of ethylene oxide per mole of alcohol.

A further preferred class of nonionc surfactants comprises polyhydroxy fatty acid amides of general formula:

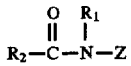

where $R_1$ is H, a $C_1$–$C_4$ hydrocarbyl, 2 hydroxyethyl, 2-hydroxypropyl or mixtures thereof, $R_2$ is a $C_5$–$C_{31}$ hydrocarbyl and Z is a polyhydroxyhydrocarbyl having a linear hydrocarbyl chain with at least three hydroxy groups directly connected to the chain, or an alkoxylated derivative thereof. In preferred members of this class the polyhydroxy hydrocarbyl moiety is derived from glucose of maltose or mixtures thereof and the $R_2$ group is a $C_{11}$–$C_{19}$ alkyl or alkenyl moiety as the $R_1$ group. Compositions incorporating such highly preferred polyhydroxy fatty acid amides are disclosed in the copending British Application No. 9113139 filed Jun. 18, 1991.

Another class of nonionic surfactants comprises alkyl polyglucoside compounds of general formula

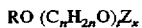

wherein Z is a moiety derived from glucose; R is a saturated hydrophobic alkyl group that contains from 12 to 18 carbon atoms; t is from 0 to 10 and n is 2 or 3; x is from 1.3 to 4, the compounds including less than 10% unreacted fatty alcohol and less than 50% short chain alkyl polyglucosides. Compounds of this type and their use in detergent compositions are disclosed in EP-B 0070074, 0070077, 0075996 and 0094118.

A further class of surfactants are the semi-polar surfactants such as amine oxides. Suitable amine oxides are selected from mono $C_8$–$C_{20}$, preferably $C_{10}$–$C_{14}$ -alkyl or alkenyl amine oxides and propylene-1,3-diamine dioxides wherein the remaining N positions are substituted by methyl, hydroxyethyl or hydroxypropyl groups.

Cationic surfactants can also be used in the detergent compositions herein and suitable quaternary ammonium surfactants are selected from mono $C_8$–$C_{16}$, preferably $C_{10}$–$C_{14}$ N-alkyl or alkenyl ammonium surfactants wherein remaining N positions are substituted by methyl, hydroxyethyl or hydroxypropyl groups.

The detergent compositions may comprise from 3% to 35% by weight of the composition of surfactant but more usually comprise from 5% to 25% by weight, more preferably from 10% to 25% by weight.

Combinations of surfactant types are preferred, more especially anionic-nonionic and also anionic-nonionic-cationic blends. Particularly preferred combinations are described in GB-A-2040987, GB 9113139 and EP-A-0087914. Although the surfactants can be incorporated into the compositions as mixtures, it is preferable to control the point of addition of each surfactant in order to optimise the physical characteristics of the composition and avoid processing problems. Preferred modes and orders of surfactant addition are described hereinafter.

As explained above the granular detergent compositions in accord with the invention also comprise a non-phosphate, silicate-based detergent builder system comprising one or more detergent builders. These can include, but are not restricted to silicates and aluminosilicates. The builder system may additionally include monomeric and oligomeric polycarboxylates, homo or copolymeric polycarboxylic acids or their salts in which the polycarboxylic acid comprises at least two carboxylic radicals separated from each other by not more than two carbon atoms, and mixtures of any of the foregoing. The builder system may additionally include alkali metal carbonates or sesqui-carbonates or bicarbonates with, optionally, calcium carbonate (calcite). The builder system is generally present in an amount of from 1% to 80% by weight of the composition preferably from 20% to 80%, more preferably from 25% to 70% by weight.

Preferred builder systems are free of boron compounds and any polymeric organic materials are biodegradable.

Suitable silicates are those having an $SiO_2$:$Na_2O$ ratio in the range from 1.6 to 3.4, the so-called amorphous silicates of $SiO_2$ : $Na_2O$ ratios from 2.0 to 2.8 being preferred. These materials can be added at various points of the manufacturing process, such as in a slurry of components that are spray dried or in the form of an aqueous solution serving as agglomerating agent for other solid components, or, where the silicates are themselves in particulate form, as solids to the other particulate components of the composition. However, for compositions in which the percentage of spray dried components is low i.e. 30%, it is preferred to include the amorphous silicate in the spray-dried components.

Within the silicate class, highly preferred materials are crystalline layered sodium silicates of general formula

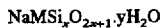

wherein M is sodium or hydrogen, x is a number from 1.9 to 4 and y is a number from 0 to 20. Crystalline layered sodium silicates of this type are disclosed in EP-A-0164514 and methods for their preparation are disclosed in DE-A-3417649 and DE-A-3742043. For the purposes of the present invention, x in the general formula above has a value of 2, 3 or 4 and is preferably 2. More preferably M is sodium and y is 0 and preferred examples of this formula comprise the α, β, γ and δ forms of $Na_2Si_2O_5$. These materials are available from Hoechst AG FRG as respectively NaSKS-5, NaSKS-7, NaSKS-11 and NaSKS-6. The most preferred material is δ-$Na_2Si_2O_5$, NaSKS-6. Crystalline layered silicates are incorporated either as dry mixed solids, or as solid components of aggomerates with other components.

Whilst a range of aluminosilicate ion exchange materials can be used, preferred sodium aluminosilicate zolites have the unit cell formula

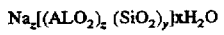

wherein z and y are at least 6; the molar ratio of z to y is from 1.0 to 0.5 and x is at least 5, preferably from 7.5 to 276, more preferably from 10 to 264. The aluminosilicate materials are in hydrated form and are preferably crystalline, containing from 10% to 28%, more preferably from 18% to 22% water in bound form.

The above aluminosilicate ion exchange materials are further characterised by a particle size diameter of from 0.1 to 10 micrometers, preferably from 0.2 to 4 micometers. The term "particle size diameter" herein represents the average particle size diameter of a given ion exchange material as determined by conventional analytical techniques such as, for example, microscopic determination utilizing a scanning electron microscope or by means of a laser granulometer. The aluminosilicate ion exchange materials are further characterised by their calcium ion exchange capacity, which is at least 200 mg equivalent of $CaCO_3$ water hardness/g of aluminosilicate, calculated on an anhydrous basis, and which generally is in the range of from 300 mg eq./g to 352 mg eq./g. The aluminosilicate ion exchange materials herein are still further characterised by their calcium ion exchange rate which is at least 130 mg equivalent of $CaCO_3$/liter/minute/(g/liter) [2 grains $Ca^{++}$/gallon/minute/(gram/gallon)] of aluminosilicate (anhydrous basis), and which generally lies within the range of from 130 mg equivalent of $CaCO_3$/liter/minute/(gram/liter) [2 grains/gallon/minute/(gram/gallon)] to 390 mg equivalent of $CaCO_3$/liter/minute/(gram/liter) [6 grains/gallon/minute/(gram/gallon)], based on calcium ion hardness. Optimum aluminosilicates for builder purposes exhibit a calcium ion exchange rate of at least 260 mg equivalent of $CaCO_3$/liter/minute/(gram/liter) [4 grains/gallon/minute/(gram/gallon)].

Aluminosilicate ion exchange materials useful in the practice of this invention are commercially available and can be naturally occurring materials, but are preferably synthetically derived. A method for producing aluminosilicate ion exchange materials is discussed in U.S. Pat. No. 3,985,669. Preferred synthetic crystalline aluminosilicate ion exchange materials useful herein are available under the designations Zeolite A, Zeolite B, Zeolite P, Zeolite MAP, Zeolite X, Zeolite Y, Zeolite HS and mixtures thereof. In an especially preferred embodiment, the crystalline aluminosilicate ion exchange material is Zeolite A and has the formula $$Na_{12}[(ALO_2)_{12}(SiO_2)_{12}] \cdot xH_2O$$

wherein x is from 20 to 30, especially 27. Zeolite X of formula $Na_{86}[(ALO_2)_{86}(SiO_2)_{106}] \cdot 276\ H_2O$ is also suitable, as well as Zeolite HS of formula $Na_6[(ALO_2)_6(SiO_2)_6]\ 7.5\ H_2O$.

Suitable water-soluble monomeric and oligomeric carboxylate builders can be selected from a wide range of compounds but such compounds preferably have a first carboxyl logarithmic acidity constant ($pK_1$) of less than 9, preferably of between 2 and 8.5, more preferably between 4 and 7.5.

The logarithmic acidity constant is defined by reference to the equilibrium $$H^+ + A^- \rightleftharpoons HA$$

where $A^-$ is the singly ionized anion of the carboxylate builder salt.

The equilibrium constant is therefore for dilute solutions given by the expression $$K_1 = \frac{[HA]}{[H][A]}$$

and $pK_1 = \log_{10} K_1$.

For the purposes of this specification, acidity constants are defined as 25° C. and at zero ionic strength. Literature values are taken where possible (see Stability Constants of Metal-Ion Complexes, Special Publication No. 25, the Chemical Society, London): where doubt arises they are determined by potentiometric titration using a glass electrode.

The carboxylate or polycarboxylate builders can be monomeric or oligomeric in type although monomeric carboxylates are generally preferred for reasons of cost and performance.

Monomeric and oligomeric builders can be selected from acyclic, alicyclic, heterocyclic and aromatic carboxylates having the general formulae

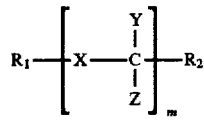
(a)

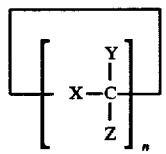
(b)

or

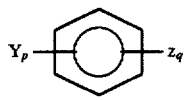
(c)

wherein $R_1$ represents H, $C_{1-30}$ alkyl or alkenyl optionally substituted by hydroxy, carboxy, sulfo or phosphono groups or attached to a polyethyleneoxy moiety containing up to 20 ethyleneoxy groups; $R_2$ represents H, $C_{1-4}$ alkyl, alkenyl or hydroxy alkyl, or alkaryl, sulfo, or phosphono groups; X represents a single bond; O; S; SO; or $NR_1$; Y represents H; carboxy; hydroxy; carboxymethyloxy; or $C_{1-30}$ alkyl or alkenyl optionally substituted by hydroxy or carboxy groups; Z represents H; or carboxy; m is an integer from 1 to 10; n is an integer from 3 to 6; p, q are integers from 0 to 6, p+q being from 1 to 6; and wherein, X, Y, and Z each have the same or different representations when repeated in a given molecular formula, and wherein at least one Y or Z in a molecule contain a carboxyl group.

Suitable carboxylates containing one carboxy group include lactic acid, glycollic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitates and citraconates as well as succinate derivatives such as the carboxymethyloxysuccinates described in British Patent No. 1,379,241, lactoxysuccinates described in British Patent No. 1,389,732, and aminosuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829,1, and the 1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis, cis,cis-tetracarboxylates, cyclopentadienide pentacarboxylates, 2,3,4,5-tetrahydrofuran-cis, cis, cis-tetracarboxylates, 2,5-tetrahydrofuran-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly citrates.

The parent acids of the monomeric or oligomeric polycarboxylate chelating agents or mixtures thereof with their salts, e.g. citric acid or citrate/citric acid mixtures are also contemplated as components of builder systems useful in the present invention.

Other suitable water soluble organic salts are the homo- or co-polymeric polycarboxylic acids or their salts in which the polycarboxylic acid comprises at least two carboxyl radicals separated from each other by not more than two carbon atoms. Polymers of the latter type are disclosed in GB-A-1,596,756. Examples of such salts are polyacrylates of MWt 2000–5000 and their copolymers with maleic anhydride, such copolymers having a molecular weight of from 20,000 to 70,000, especially about 40,000. These materials are normally used at levels of from 0–0.5% to 10% by weight, more preferably from 0.75% to 8%, most preferably from 1% to 6% by weight of the composition.

Within the preferred compositions, a sodium aluminosilicate such as Zeolite A will comprise from 20% to 60% by weight of the total amount of builder, a monomeric or oligomeric carboxylate will comprise from 10% to 30% by weight of the total amount of builder and a crystalline layered silicate will comprise from 10% to 65% by weight of the total amount of builder. In such compositions, the builder ingredient preferably also incorporates a combination of auxiliary inorganic and organic builders such as sodium carbonate and maleic anhydride/acrylic acid copolymers in amounts of up to 35% by weight of the total builder.

The composition of the invention may include a low level of a heavy metal sequestrant. Preferred heavy metal sequestrants for inclusion in the detergent compositions of the invention include the organic phosphonates, including amino alkylene poly (alkylene phosphonates), alkali metal ethane 1-hydroxy diphosphonates, nitrilo trimethylene phosphonates, ethylene diamine tetra methylene phosphonates and diethylene triamine penta methylene phosphonates. Such phosphonate compounds may be present either in their acid form or as a complex of either an alkali or alkaline metal ion, the molar ratio of said metal ion to said phosphonate compound being at least 1:1. Such complexes are described in U.S. Pat. No. 4,259,200. Preferably, the organic phosphonate compounds are in the form of their magnesium salt.

Organic phosphonate compounds, and mixtures thereof, may be present in the detergent compositions of the invention at levels of from 0.05% to 10% by weight of the composition, preferably 0.1% to 2% by weight, most preferably 0.2% to 0.6% by weight.

Compositions in accordance with the invention can also contain other optional detergent ingredients. Anti-redeposition and soil-suspension agents, optical brighteners, soil release agents, dyes and pigments are examples of such optional ingredients and can be added in varying amounts as desired.

Anti-redeposition and soil-suspension agents suitable herein include cellulose derivatives such as methylcellulose, carboxymethylcellulose and hydroxyethylcellulose, and homo- or co-polymeric polycarboxylic acids or their salts. Polymers of this type include copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition. Other useful polymeric materials are the polyethylene glycols, particularly those of molecular weight 1000–10000, more particularly 2000 to 8000 and most preferably about 4000. These are used at levels of from 0.20% to 5%, more preferably from 0.25% to 2.5% by weight. These polymers and the previously mentioned homo-or co-polymeric polycarboxylate salts are valuable for improving whiteness maintenance, fabric ash deposition, and cleaning performance of clay, proteinaceous and oxidizable soils in the presence of transition metal impurities.

Preferred optical brighteners are anionic in characters, examples of which are disodium 4,4$^1$-bis-(2-diethanolomino-4-anilino-s-triazin-6-ylamino)stilbene-2:2$^1$ disulphonate, disodium 4, 4$^1$-bis-(2-morpholino-4-anilino-s-triazin-6-ylamino stilbene-2:2$^1$-disulphonate, disodium 4,4$^1$-bis-(2,4-dianilino-s-triazin-6-ylamino)stilbene-2:2$^1$-disulphonate, monosodium 4$^1$, 4$^{11}$-bis-(2,4-dianilino-s-triazin-6-ylamino) stilbene-2-sulphonate, disodium 4,4$^1$-bis-(2-anilino-4-(N-methyl-N-2-hydroxyethylamino)-s-triazin-6-ylamino)stilbene-2,2$^1$-disulphonate, disodium 4,4$^1$-bis-(4-phenyl-2,1,3-triazol-2-yl) -stilbene-2, 2$^1$disulphonate, disodium 4,4$^1$bis(2-anilino-4-(1-methyl-2-hydroxyethylamino)-s-triazin-6-ylamino)stilbene-2, 2$^1$disulphonate and sodium 2 (stilbyl-4$^{11}$-(naphtho-1$^1$,2$^1$:4, 5)-1,2,3-triazole-2$^{11}$-sulphonate.

Soil-release agents useful in composition of the present invention are conventionally copolymers or terpolymers of terephthalic acid with ethylene glycol and/or propylene glycol units in various arrangements. Examples of such polymers are disclosed in the commonly assigned U.S. Pat. Nos. 4116885 and 4711730 and European Published Patent Application No. 0272033. A particular preferred polymer in accordance with EP-A-0272033 has the formula

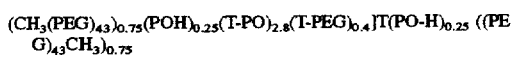

where PEG is —(OC$_2$H$_4$)O—, PO is (OC$_3$H$_6$O) and T is (pCOC$_6$H$_4$CO).

Certain polymeric materials such as polyvinyl pyrrolidones typically of MWt 5000–20000, preferably 10000–15000, also form useful agents in preventing the transfer of labile dyestuffs between fabrics during the washing process.

Another optional ingredient is a suds suppressor, exemplified by silicones, and silica-silicone mixtures. Silicones can be generally represented by alkylated polysiloxane materials while silica is normally used in finely divided forms, exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent-impermeable carrier. Alternatively the suds suppressor can be dissolved or dispersed in a liquid carrier and applied by spraying on to one or more of the other components.

As mentioned above, useful silicone suds controlling agents can comprise a mixture of an alkylated siloxane, of the type referred to hereinbefore, and solid silica. Such mixtures are prepared by affixing the silicone to the surface of the solid silica. A preferred silicone suds controlling agent is represented by a hydrophobic silanated (most preferably trimethyl-silanated) silica having a particle size in the range from 10 nanometers to 20 nanometers and a specific surface area above 50 m$^2$/g, intimately admixed with dimethyl silicone fluid having a molecular weight in the range from about 500 to about 200,000 at a weight ratio of silicone to silanated silica of from about 1:1 to about 1:2.

A preferred silicone suds controlling agent is disclosed in Bartollota et al U.S. Pat. No. 3,933,672. Other particularly useful suds suppressors are the self-emulsifying silicone suds suppressors, described in German Patent Application DTOS 2,646,126 published Apr. 28, 1977. An example of such a compound is DC-544, commercially available from Dow Corning, which is a siloxane/glycol copolymer.

The suds suppressor described above are normally employed at levels of from 0.001% to 0.5% by weight of the composition, preferably from 0.01% to 0.1% by weight.

The preferred methods of incorporation comprise either application of the suds suppressors in liquid form by spray-on to one or more of the major components of the composition or alternatively the formation of the suds suppressors into separate particulates that can then be mixed with the other solid components of the composition. The incorporation of the suds modifiers as separate particulates also permits the inclusion therein of other suds controlling materials such as $C_{20}$–$C_{24}$ fatty acids, microcrystalline waxes and high MWt copolymers of ethylene oxide and propylene oxide which would otherwise adversely affect the dispersibility of the matrix. Techniques for forming such suds modifying particulates are disclosed in the previously mentioned Bartollotta et al U.S. Pat. No. 3,933,672.

An other optional ingredient useful in the present invention is one or more enzymes.

Preferred enzymatic materials include the commercially available amylases, neutral and alkaline proteases, lipases, esterases and cellulases conventionally incorporated into detergent compositions. Suitable enzymes are discussed in U.S. Pat. Nos. 3,519,570 and 3,533,139.

Preferred commercially available protease enzymes include those sold under the tradnames Alcalase and Savinase by Novo Industries A/S (Denmark) and Maxatase by International Bio-Synthetics, Inc. (The Netherlands).

Preferred amylases include, for example, α-amylases obtained from a special strain of B licheniforms, described in more detail in GB-1,296,839 (Novo). Preferred commercially available amylases include for example, Rapidase, sold by International Bio-Synthetics Inc. and Termamyl, sold by Novo Industries A/S.

An especially preferred lipase enzyme is manufactured and sold by Novo Industries A/S (Denmark) under the trade name Lipolase (Biotechnology Newswatch, 7 Mar. 1988, page 6) and mentioned along with other suitable lipases in EP-A-0258068 (Novo).

Fabric softening agents can also be incorporated into laundry detergent compositions. These agents may be inorganic or organic in type. Inorganic softening agents are examplified by the smectite clays disclosed in GB-A-1,400,898. Organic fabric softening agents include the water insoluble tertiary amines as disclosed in GB-A-1514276 and EP-B-0011340.

Their combination with mono $C_{12}$–$C_{14}$ quaternary ammonium salts is disclosed in EP-B-0026527 & 528. Other useful organic fabric softening agents are the dilong chain amides as disclosed in EP-B-0242919. Additional organic ingredients of fabric softening systems include high molecular weight polyethylene oxide materials as disclosed in EP-A-0299575 and 0313146.

Levels of smectite clay are normally in the range from 5% to 15%, more preferably from 8% to 12% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight, whilst the high molecular weight polyethylene oxide materials and the water soluble cationic materials are added at levels of from 0.1% to 2%, normally from 0.15% to 1.5% by weight. Where a portion of the composition is spray dried, these materials can be added to the aqueous slurry fed to the spray drying tower, although in some instances it may be more convenient to add them as a dry mixed particulate, or spray them as a molten liquid on to other solid components of the composition.

A feature of the composition of the present invention is that it may be of relatively high density in comparison with conventional laundry detergent compositions. Such high density compositions have become known as concentrated products and are characterised by a bulk density of at least 650 g/liter, more usually at least 700 g/liter and more preferably in excess of 800 g/liter. Bulk density is measured by means of a simple funnel and cup device consisting of a conical funnel moulded rigidly on a base and provided with a flap valve at its lower extremity to allow the contents of the funnel to be emptied into an axially aligned cylindrical cup disposed below the funnel. The funnel is 130 mm high and has internal diameters of 130 mm and 40 mm at its respective upper and lower extremities. It is mounted so that the lower extremity is 140 mm above the upper surface of the base. The cup has an overall height of 90 mm, an internal height of 87 mm and an internal diameter of 84 mm. Its nominal volume is 500 ml.

To carry out a measurement, the funnel is filled with powder by hand pouring, the flap valve is opened and powder allowed to overfill the cup. The filled cup is removed from the frame and excess powder removed from the cup by passing a straight edged implement eg; a knife, across its upper edge. The filled cup is then weighed and the value obtained for the weight of powder doubled to provide a bulk density in g/liter. Replicate measurements are made as required.

Another feature of compositions of the present invention is that they may incorporate at least one multi-ingredient component ie they may not comprise compositions formed merely by dry-mixing all of the individual ingredients. Compositions in which each individual ingredient is dry-mixed are generally dusty, slow to dissolve and also tend to cake and develop poor particle flow characteristics in storage. As described above it is preferred that the coated percarbonate particles are introduced into the composition by dry mixing.

The compositions of the invention can be made via a variety of methods including dry mixing, spray drying, agglomeration and granulation and preferred methods involve combinations of these techniques. A preferred method of making the composition involves a combination of spray drying, agglomeration in a high speed mixer and dry mixing.

Preferred detergent compositions in accordance with the invention comprise at least two particulate multi-ingredient components. The first component comprises at least 15%, conventionally from 25% to 50%, but more preferably no more than 35% by weight of the composition and the second component from 1% to 50%, more preferably 10% to 40% by weight of the composition.

In a preferred embodiment of the invention, one multi-ingredient component comprises an agglomerate of non-spray-dried ingredients together with a second multi-ingredient component comprising a spray-dried powder.

The first component comprises a particulate incorporating an anionic surfactant in an amount of from 0.75% to 40% by weight of the powder and one or more inorganic and/or organic salts in an amount of from 99.25% to 60% by weight of the powder. The particulate can have any suitable form such as granules, flakes, prills, marumes or noodles but is preferably granular. The granules themselves may be agglomerates formed by pan or drum agglomeration or by in-line mixers but are customarily spray dried particles produced by atomising an aqueous slurry of the ingredients in a hot air stream which removes most of the water. The spray dried granules are then subjected to densification steps, eg by high speed cutter mixers and/or compacting mills, to increase density before being reagglomerated. For illustrative purposes, the first component is described hereinafter as a spray dried powder.

Suitable anionic surfactants for the purposes of the first component have been found to be slowly dissolving linear alkyl sulfate salts in which the alkyl group has an average of from 16 to 22 carbon atoms, and linear alkyl carboxylate salts in which the alkyl group has an average of from 16 to 24 carbon atoms.

The alkyl groups for both types of surfactant are preferably derived from natural fats such as tallow. Shorter chain alkyl sulfates or carboxylates, in which the alkyl group is derived from sources comprising a mixture of alkyl moieties more than 40% of which contain 14 or less carbon atoms, are less suitable as they cause the first component to form a gel like mass during dissolution.

The level of anionic surfactant in the spray dried powder forming the first component is from 0.75% to 40% by weight, more usually 2.5% to 25%, preferably from 3% to 20% and most preferably from 5% to 15% by weight. Water-soluble surfactants such as linear alkyl benzene sulphonates or $C_{14}$–$C_{15}$ alkyl sulphates can be included or alternatively may be applied subsequently to the spray dried powder by spray on.

The other major ingredient of the spray dried powder is one or more inorganic or organic salts that provide the crystalline structure for the granules. The inorganic and/or organic salts may be water-soluble or water-insoluble, the latter type being comprised by the, or the major part of the, water-insoluble builders where these form part of the builder ingredient. Suitable water soluble inorganic salts include the alkali metal carbonates and bicarbonates. Alkali metal silicates other than crystalline layered silicates can also be present in the spray dried granule provided that aluminosilicate does not form part of the spray dried component.

Where an aluminosilicate zeolite forms the, or part of the, builder ingredient, it is preferred that it is not added directly by dry mixing to the other components, but is incorporated into the multi-ingredient component(s). Where incorporation of the zeolite takes place in the spray-dried granule, any silicate present should not form part of the spray-dried granule. In these circumstances incorporation of the silicate can be achieved in several ways, eg by producing a separate silicate-containing spray-dried particulate, by incorporating the silicate into an agglomerate of other ingredients, or more preferably by adding the silicate as a dry mixed solid ingredient.

The first component can also include up to 15% by weight of miscellaneous ingredients such as brighteners, anti-redeposition agents, photoactivated bleaches and heavy metal sequestering agents. Where the first component is a spray dried powder it will normally be dried to a moisture content of from 7% to 11% by weight, more preferably from 8% to 10% by weight of the spray dried powder. Moisture contents of powders produced by other processes such as agglomeration may be lower and can be in the range 1–10% by weight.

The stability of the percarbonate in the product may depend upon the Equilibrium Relative Humidity of the product, which itself reflects the level of active moisture in the product. Spray-dried powder is a prime source of the active moisture and also contributes significantly to the heavy metal ion content of a product. Thus although it represents a convenient and valuable processing route for certain ingredients, particularly surfactants and organic polymers, by providing acceptable particle solution and flow characteristics, its benefit has to be balanced against the adverse effect it exerts on percarbonate stability. For these reasons the amount of any spray-dried component should preferably not exceed 35% by weight of the composition and most preferably should not exceed 30% by weight.

The particle size of the first component is conventional and preferably not more than 5% by weight should be above 1.4 mm, while not more than 10% by weight should be less than 0.15 mm in maximum dimension. Preferably at least 60%, and most preferably at least 80%, by weight of the powder lies between 0.9 mm and 0.25 mm in size. For spray dried powders, the bulk density of the particles from the spray drying tower is conventionally in the range from 540 to 600 g/liter and this is then enhanced by further processing steps such as size reduction in a high speed cutter/mixer followed by compaction. Alternatively, processes other than spray drying may be used to form a high density particulate directly.

A second component of a preferred composition in accordance with the invention is another multi-ingredient particulate containing a water soluble surfactant.

This water-soluble surfactant may be anionic, nonionic, cationic or semipolar in type or a mixture of any of these. Suitable surfactants are listed hereinbefore but preferred surfactants are $C_{14}$–$C_{15}$ alkyl sulphates linear $C_{11}$–$C_{15}$, alkyl benzene sulphonates and fatty $C_{14}$–$C_{18}$ methyl ester sulphonates. The second component may have any suitable physical form ie; it may take the form of flakes, prills, marumes, noodles, ribbons or granules which may be spray-dried or non spray-dried agglomerates. Although the second component could in theory comprise the water soluble surfactant on its own, in practice at least one organic or inorganic salt is included to facilitate processing. This provides a degree of crystallinity, and hence acceptable flow characteristics, to the particulate and may be any one or more of the organic or inorganic salts present in the first component.

The particle size range of the second component is not critical but should be such as to obviate segregation from the particles of the first component when blended therewith. Thus not more than 5% by weight should be above 1.4 mm while not more than 10% should be less than 0.15 mm in maximum dimension.

The bulk density of the second component will be a function of its mode of preparation. However, the preferred form of the second component is a mechanically mixed agglomerate which may be made by adding the ingredients dry or with an agglomerating agent to a pan agglomerator, Z blade mixer or more preferably an in-line mixer such as those manufactured by Schugi (Holland) BV 29 Chroomstraat 8211 AS, Lelystad, Netherlands and Gebruder Lodige Maschinenban GmbH, D-4790 Paderborn 1, Elsenerstrasse 7-9, Postfach 2050 FRG. By this means the second component can be given a bulk density in the range from 650 g/liter to 1190 g/liter more preferably from 750 g/liter to 850 g/liter.

Preferred compositions include a level of alkali metal carbonate in the second component corresponding to an amount of from 3% to 15% by weight of the composition, more preferably from 5% to 12% by weight. This will preferably provide a level of carbonate in the second component of from 20% to 40% by weight.

A highly preferred ingredient of the second component is also a hydrated water insoluble aluminosilicate ion exchange material of the synthetic zeolite type, described hereinbefore, present at from 10% to 35% by weight of the second component. The amount of water insoluble aluminosilicate material incorporated in this way is from 1% to 10% by weight of the composition, more preferably from 2% to 8% by weight.

In one process for preparing the second component, the surfactant salt is formed in situ in an inline mixer. The liquid acid form of the surfactant is added to a mixture of particulate anhydrous sodium carbonate and hydrated sodium aluminosilicate in a continuous high speed blender such as a lodige C6 mixer and neutralised to form the surfactant salt whilst maintaining the particulate nature of the mixture. The resultant agglomerated mixture forms the second component which is then added to other components of the product. In a variant of this process, the surfactant salt is pre-neutralised and added as a viscous paste to the mixture of the other ingredients. In this variant, the mixer serves merely to agglomerate the ingredients to form the second component.

Laundry detergent compositions in accordance with the invention can also benefit from delivery systems that provide transient localised high concentrations of product in the drum of an automatic washing machine at the start of the wash cycle, thereby also avoiding problems associated with loss of product in the pipework or sump of the machine.

Delivery to the drum can most easily be achieved by incorporation of the composition in a bag or container from which it is rapidly releasable at the start of the wash cycle in response to agitation, a rise in temperature or immersion in the wash water in the drum. Alternatively the washing machine itself may be adapted to permit direct addition of the composition to the drum e.g. by a dispensing arrangement in the access door.

Products comprising a laundry detergent composition enclosed in a bag or container are usually designed in such a way that container integrity is maintained in the dry state to prevent egress of the contents when dry, but are adapted for release of the container contents on exposure to a washing environment, normally on immersion in an aqueous solution.

Usually the container will be flexible, such as a bag or pouch. The bag may be of fibrous construction coated with a water impermeable protective material so as to retain the contents, such as is disclosed in European published Patent Application No. 0018678. Alternatively it may be formed of a water-insoluble synthetic polymeric material provided with an edge seal or closure designed to rupture in aqueous media as disclosed in European published Patent Application Nos. 0011500, 0011501, 0011502, and 0011968. A convenient form of water frangible closure comprises a water soluble adhesive disposed along and sealing one edge of a pouch formed of a water impermeable polymeric film such as polyethylene or polypropylene. In a variant of the bag or container form, laminated sheet products can be employed in which a central flexible layer is impregnated and/or coated with a composition and then one or more outer layers are applied to produce a fabric-like aesthetic effect. The layers may be sealed together so as to remain attached during use, or may separate on contact with water to facilitate the release of the coated or impregnated material.

An alternative laminate form comprises one layer embossed or deformed to provide a series of pouch-like containers into each of which the detergent components are deposited in measured amounts, with a second layer overlying the first layer and sealed thereto in those areas between the pouch-like containers where the two layers are in contact. The components may be deposited in particulate, paste or molten form and the laminate layers should prevent egress of the contents of the pouch-like containers prior to their addition to water. The layers may separate or may remain attached together on contact with water, the only requirement being that the structure should permit rapid release of the contents of the pouch-like containers into solution. The number of pouch-like containers per unit area of substrate is a matter of choice but will normally vary between 500 and 25,000 per square meter.

Suitable materials which can be used for the flexible laminate layers in this aspect of the invention include, among others, sponges, paper and woven and non-woven fabrics.

However the preferred means of carrying a laundry process is to introduce the composition into the liquid surrounding the fabrics that are in the drum via a reusable dispensing device having walls that are permeable to liquid but impermeable to the solid composition.

Devices of this kind are disclosed in European Patent Application Publication Nos. 0343069 & 0343070. The latter Application discloses a device comprising a flexible sheath in the form of a bag extending from a support ring defining an orifice, the orifice being adapted to admit to the bag sufficent product for one washing cycle. A portion of the washing medium flows through the orifice into the bag, dissolves the product, and the solution then passes outwardly through the orifice into the washing medium. The support ring is provided with a masking arrangement to prevent egress of wetted, undissolved, product, this arrangement typically comprising radially extending walls extending from a central boss in a spoked wheel configuration, or a similar structure in which the walls have a helical form. An article by J. Bland published in Manufacturing Chemist, November 1989, pages 41–46 also describes especially preferred dispensing devices for use with granular laundry detergent products which are of a type commonly known as the "granulette".

In the detergent compositions given below as an example of the invention, the abbreviated component identifications have the following meanings:

| | |
|---|---|
| LAS | Sodium linear $C_{12}$ alkyl benzene sulphonate |
| $C_{16-18}$ AS | Sodium $C_{16}$–$C_{18}$ alkyl sulphate |
| $C_{14-15}$ AE7 | A $C_{14}$–$C_{15}$ primary alcohol condensed with an average of 7 moles of ethylene oxide per mole |
| $C_{16-18}$ AE11 | A $C_{16}$–$C_{18}$ primary alcohol condensed with an average of 11 moles of ethylene oxide per mole |
| TAED | Tetraacetyl ethylene diamine |
| Silicate | Amorphous Sodium Silicate |
| CMC | Sodium carboxymethyl cellulose |
| Zeolite 4A | Hyrated Sodium Aluminosilicate of formula $Na_{12}(AlO_2SiO_2)12 \ 27H_2O$ having a primary particle size in the range from 1 to 10 micrometers |
| MA/AA | Copolymer of 1:4 maleic/acrylic acid, average molecular weight about 70,000, available from BASF under the trade name Sokalan CP5 |
| Brightener | Disodium 4,4'-bis(2-morpholino-4-anilinos-triazin-6-ylamino) stilbene-2:2'-disulphonate |
| DTPMP | Diethylene triamine penta (Methylene phosphonic acid), marketed by Monsanto under the Trade name Dequest 2060 |
| Na Percarbonate | Anhydrous sodium percarbonate bleach of empirical formula $2Na_2CO_3 \cdot 3H_2O_2$ coated with $Na_2CO_3$ and $Na_2CO_4$ in a molar ratio of 2.5:1 (weight ratio of percarbonate:coatings follows) |
| Perborate Monohydrate | Anhydrous sodium perborate monohydrate bleach, empirical formula $NaBO_2 \cdot H_2O_2$ |
| Perborate Tetrahydrate | Sodium perborate tetrahydrate of nominal formula $NaBO_2 \cdot 3H_2O \cdot H_2O_2$ |

D.3.) Example

The following compositions were prepared. Composition A is a prior art composition. Compositions B and C are compositions according to the invention.

|                                             | A       | B       | C       |
|---------------------------------------------|---------|---------|---------|
| SPRAY DRIED COMPOSITION                 |         |         |         |
| Zeolite 4A                                  | 13%     | 13%     | 13%     |
| Copolymer MA/AA                             | 4%      | 4%      | 4%      |
| Phosphonate (DTDMP)                         | 0.5%    | 0.5%    | 0.5%    |
| Magnesium Sulfate                           | 0.5%    | 0.4%    | 0.4%    |
| Brightener                                  | 0.2%    | 0.2%    | 0.2%    |
| AGGLOMERATE (MEAN PARTICLE SIZE = 550 MICRONS) | | | |
| LAS                                         | 7.0%    | 7.0%    | 7.0%    |
| C16–18 AS                                   | 2.0%    | 2.0%    | 2.0%    |
| Zeolite 4A                                  | 7.5%    | 7.5%    | 7.5%    |
| Sodium Carbonate                            | 8.0%    | 8.0%    | 8.0%    |
| CMC                                         | 0.5%    | 0.5%    | 0.5%    |
| SPRAY-ON                                |         |         |         |
| C14–15 AE7                                  | 4.0%    | 4.0%    | 4.0%    |
| C16–18 AE11                                 | 1.0%    | 1.0%    | 1.0%    |
| ADDITIVES                               |         |         |         |
| TAED                                        | 5%      | 5%      | 5%      |
| Sodium Carbonate                            | 10%     | 10%     | 10%     |
| Silicate                                    | 3%      | 3%      | 3%      |
| Perborate Monohydrate                       | 10%     | —       | —       |
| Perborate Tetrahydrate                      | 10%     | —       | —       |
| Na Percarbonate 39:1                        | —       | 20%     | —       |
| 19:1                                        | —       | —       | 20%     |
| Moisture/Miscellaneous Balance              | 100%    | 100%    | 100%    |
| Product eRH (relative humidity equilibrium) | 25%     | 25%     | 25%     |
| Mean particle size = 400 microns            | >710 microns 8% |||
|                                             | >425 microns 31% |||
|                                             | >250 microns 81% |||
|                                             | >150 microns 96% |||
|                                             | <150 microns 4% |||

These compositions were placed on storage in closed cartons at 40° C. and at 32° C./80% relative humidity. Hydrogen Peroxide recovery was measured after 2 weeks and 4 weeks. A high degree of hydrogen peroxide recovery indicates a low level of decomposition of perhydrate bleach has occurred.

| H2O2 Recovery after | A   | B   | C    |
|---------------------|-----|-----|------|
| 2 weeks 40° C.      | 98% | 98% | 100% |
| 4 weeks 40° C.      | 90% | 95% | 96%  |
| 2 weeks 32° C./80% eRH | 95% | 96% | 96%  |
| 4 weeks 32° C./80% eRH | 82% | 80% | 90%  |

The compositions of this invention behaved very similarly to the prior art compositions, and in fact gave improved storage stability of percarbonate over that of perborate in the prior art compositions.

What is claimed is:

1. A granular silicate-built, phosphate free, laundry detergent composition comprising alkali metal percarbonate particles of mean particle diameter below 450 μm, wherein no more than 20% of the particles have a diameter above 710 μm, said particles having a coating comprising soluble material selected form water soluble inorganic salts which can adopt a higher hydrated state, water soluble salts of carboxylic acids selected from citrates and succinates, and mixtures thereof, and wherein said coating additionally comprises one or more water soluble surfactants.

2. A detergent composition according to claim 1, wherein the particles have a mean diameter between 300 μm and 420 μm and no more than 10% of the particles have a diameter above 710 μm and no more than 5% of the particles have a diameter below 150 μm.

3. A detergent composition according to claim 1 in which the said mean diameter is below 400 μm.

4. A detergent composition according to claim 1 wherein the water soluble inorganic salts are selected from alkali metal or alkaline earth metal salts.

5. A detergent composition according to claim 4, wherein the alkali or alkaline earth metal salts are selected from carbonates, sulphates, mixed salts of sulphates and carbonates, mixed salts of chlorides and carbonates and mixed salts of nitrates and carbonates.

6. A detergent composition according to claim 1, wherein the water soluble inorganic salts are in the anhydrous state.

7. A detergent composition according to claim 1, additionally comprising additional bleaching agents selected from peroxyacid bleach precursors and organic peroxyacids and mixtures thereof.

8. A detergent composition according to claim 7, wherein the additional bleaching agent is TAED.

9. A detergent composition according to claim 1, wherein the percarbonate particles are introduced into the composition by dry mixing.

10. A detergent composition according to claim 1 in which the builder comprises zeolite.

11. A detergent composition according to claim 1 in which the builder comprises zeolite and layered silicate.

12. A detergent composition according to claim 1 additionally comprising surfactant in an amount of from 3 to 35% by weight of total composition, said surfactant being selected from anionic, cationic, non-ionic, ampholytic and zwitterionic surfactants and mixtures thereof.

13. A detergent composition according to claim 1 in which the salts of carboxylic acids are selected from citrates.

* * * * *